Figure 5:
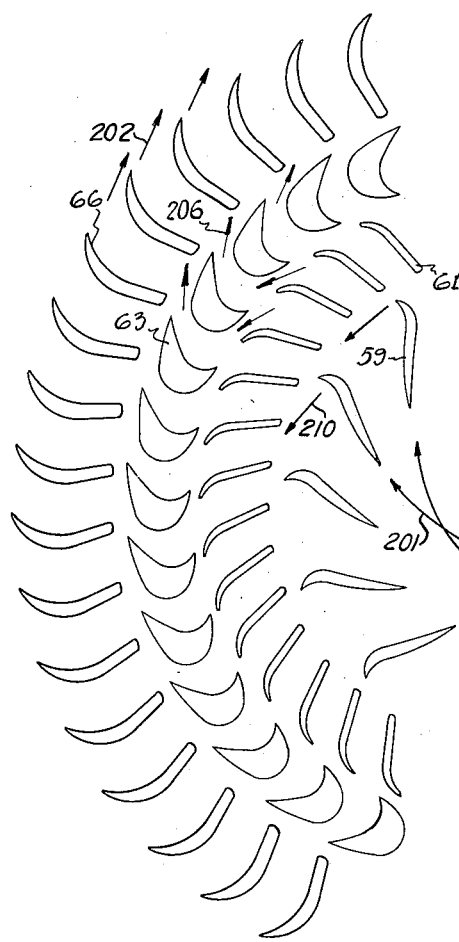

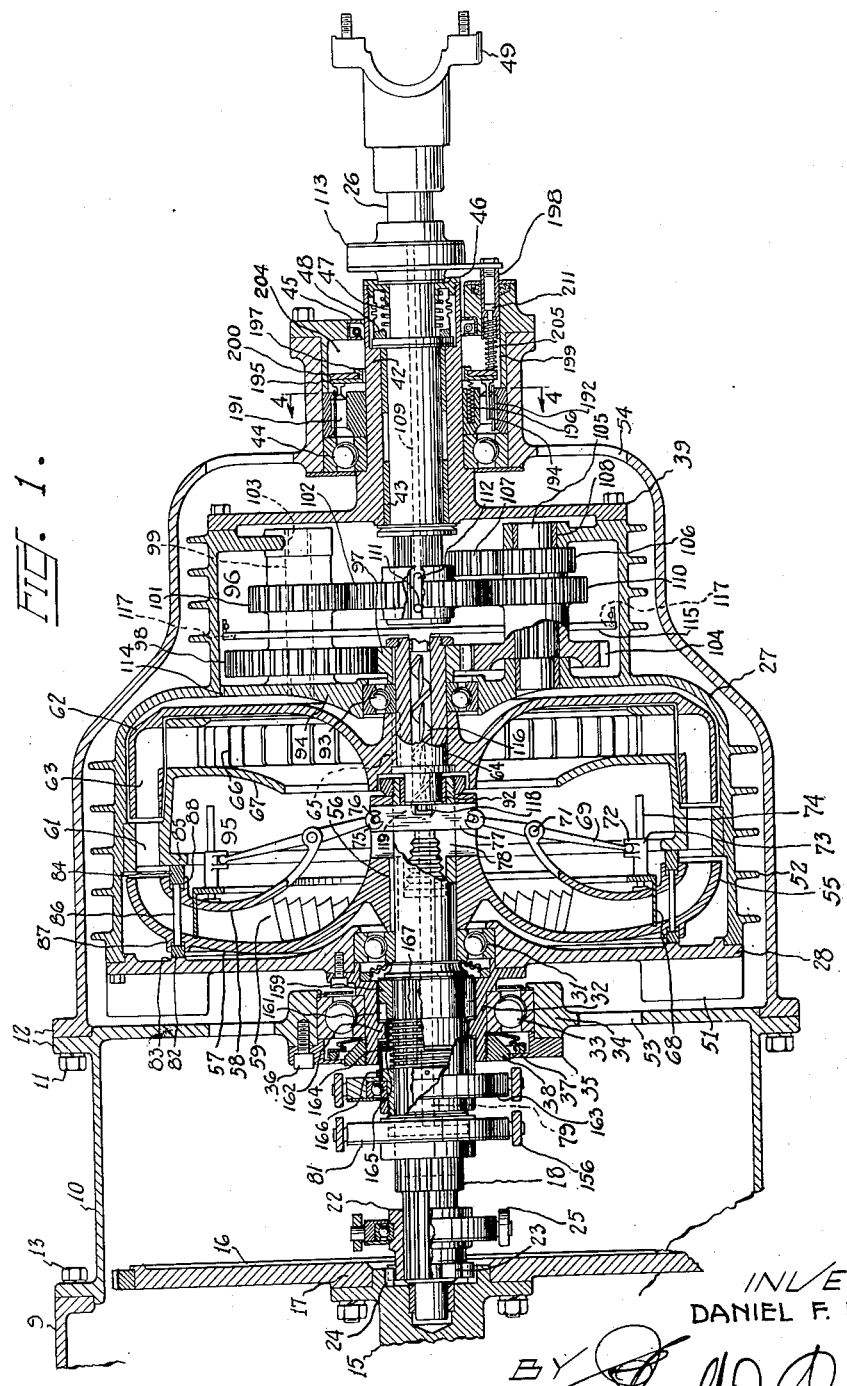

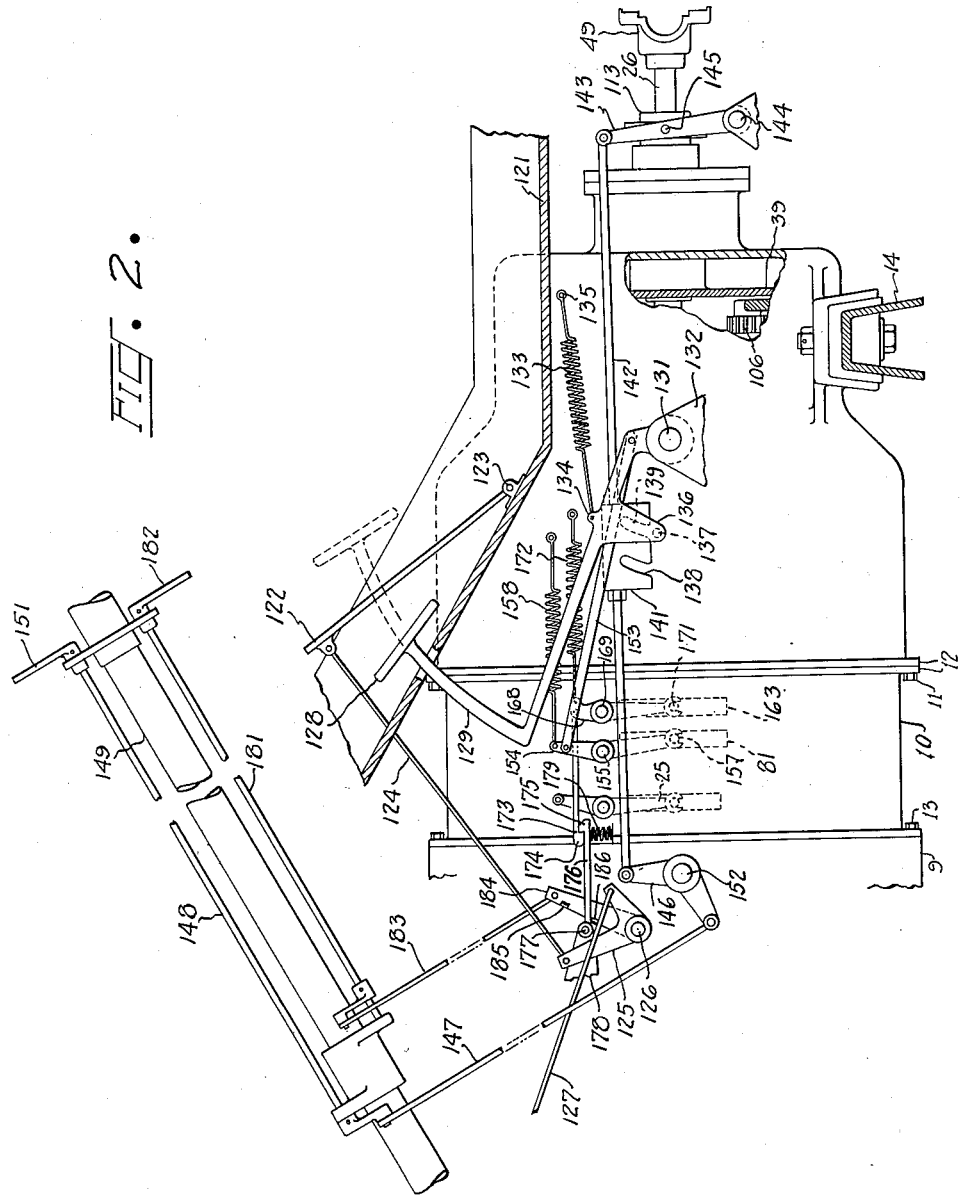

Feb. 12, 1952     D. F. McGILL     2,585,149
POWER TRANSMISSION SYSTEM
Filed Nov. 11, 1944     4 Sheets-Sheet 3
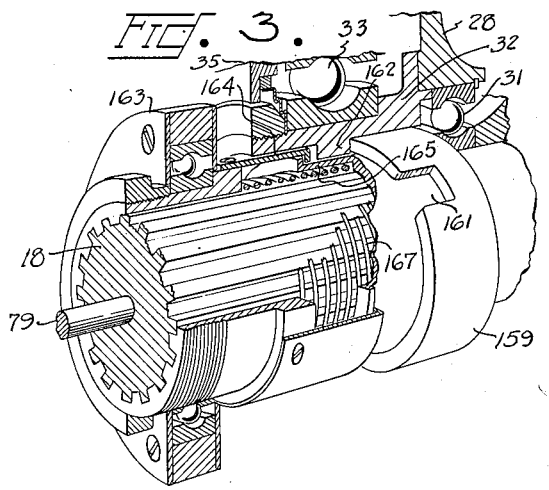
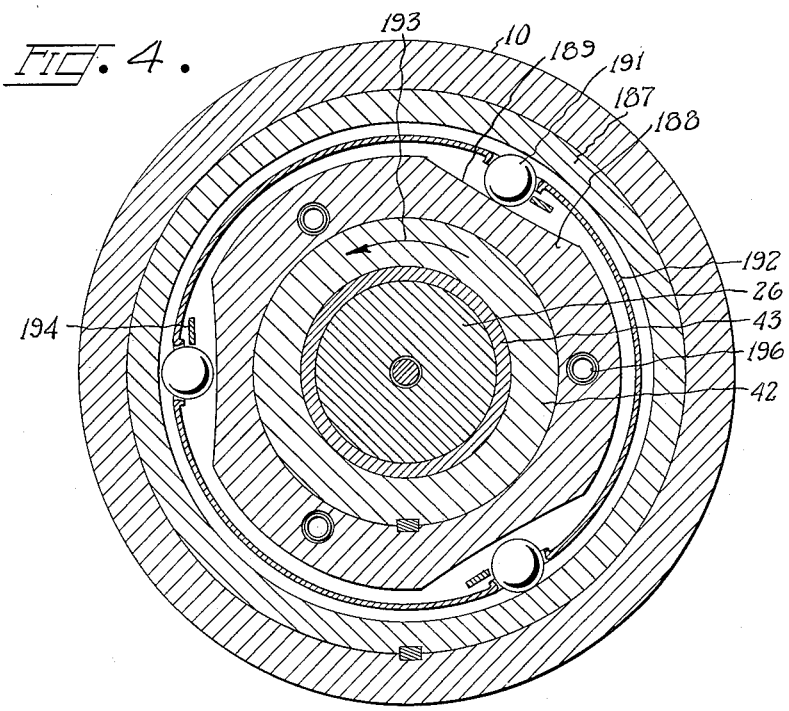
INVENTOR
DANIEL F. McGILL
BY
ATTORNEY Feb. 12, 1952 — D. F. McGILL — 2,585,149
POWER TRANSMISSION SYSTEM
Filed Nov. 11, 1944 — 4 Sheets-Sheet 4

INVENTOR
DANIEL F. McGILL
BY Harold D. Cook
ATTORNEY

Patented Feb. 12, 1952

2,585,149

UNITED STATES PATENT OFFICE 2,585,149

POWER TRANSMISSION SYSTEM

Daniel F. McGill, Portland, Oreg., assignor to Donald W. Green, Portland, Oreg., trustee Application November 11, 1944, Serial No. 563,007

25 Claims. (Cl. 74—672)

1

This invention relates to a power transmission device wherein a kinetic or turbine drive is coupled with a mechanical gear transmission to produce a compound torque ratio.

The invention is embodied in a power transmission device comprising a hydraulic transmission mechanism coupled with a mechanical gear transmission in such manner that the first of said transmissions drives through the second transmission to produce a compound multiplication or torque. In the structure shown the driven element of the first transmission is coupled to the driving element of the second transmission, the two transmissions being housed in a common rotatable housing coupled to each transmission in such manner as to distribute the load therebetween. The housing is freely rotatable in the forward direction but is prevented from rotating in the reverse direction.

The kinetic or turbine drive comprises an impeller keyed to the input shaft and a turbine runner keyed to an intermediate shaft, mounted between the input and output shafts, on which also is mounted the primary element of the second transmission. Disposed between the impeller and turbine runner, and also on the discharge side of the turbine runner, are guide vanes secured to the common housing which encloses the two transmission mechanisms. The guide vanes mounted between the impeller and the turbine runner are so arranged that they guide the liquid into the turbine runner at the proper angle regardless of the speed differential therebetween. The guide vanes mounted on the discharge side of the turbine runner direct the flow of liquid to the suction of the impeller, the direction of flow depending upon the speed of rotation of the common housing as determined by the torque requirements of the driven shaft. At such times as the load reacting through the common housing holds the guide vanes stationary, the liquid flows in the reverse direction and impinges against the forward side of the impeller vanes and increases the load on the input shaft. When the common housing and guide vanes are rotating in the forward direction, the liquid flows in a forward direction tangential to the direction of rotation of the turbine runner and impinges on the back side of the impeller vanes, tending to drive the impeller in the forward direction. The guide vanes on the discharge side of the turbine runner are positioned at the maximum distance from the center of rotation, and a smooth-walled open channel of larger area than that of the runners is provided between the discharge from these

2 vanes and the impeller to provide for tangential flow of the liquid to the impeller suction.

In the transmission mechanism embodying the instant invention, the common housing forms the carrier for the planetary gears of the mechanical gear transmission. By reason of this construction, the load on the driven shaft reacts both through the housing and guide vanes fastened thereto, and through the mechanical gear train and turbine runner. Thus, during starting periods, the housing functions as a reaction member for distributing the load of the driven shaft to both transmission mechanisms. Thereafter, as the torque requirements of the driven shaft are lessened, and the liquid discharged from the turbine runner changes direction of flow from the reverse direction to the forward direction, guide vanes on the discharge side of the turbine runner cease to function as reaction members and begin to function as driving members, and the common housing becomes a driving member for delivering torque directly through the planetary gears to the driven shaft. An important advantage of the instant invention is the provision of a structure in which there is relative movement between elements of a kinetic drive rotating in the same direction, so that there is a change of direction in the flow of liquid therethrough. Under these conditions a multiplication of torque will take place until the parts approach a 1:1 speed ratio.

The forward rotation of the casing causes the liquid leaving the second set of guide vanes to flow in the forward direction and enter the intake of the impeller in a tangential direction and at a velocity tending to drive the impeller in the forward direction. This results in reducing the power output of the engine necessary to produce the original impeller velocity of the liquid. At the same throttle opening the engine produces a greater number of R. P. M. of the input shaft and a consequent increase in the velocity of the liquid in the kinetic drive. This greater velocity may be converted into either greater torque or increased speed of the driven shaft.

The desired objects and advantages of the invention are obtained through the novel arrangement and unique construction and improved combination of the various parts hereinafter described and as illustrated on the accompanying drawings, it being understood that various changes in form, proportion, size and details of construction within the scope of the claims may be resorted to without departing from the spirit or sacrificing any of the advantages of the invention.

Figure 6:
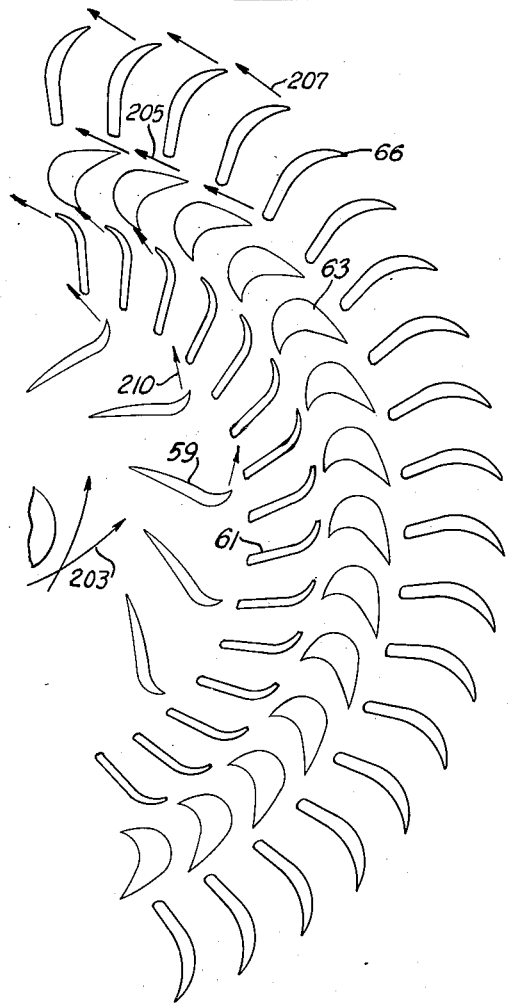

In the drawings: Figure 1 is a sectional elevation taken longitudinally of a transmission mechanism embodying the instant invention, comprising a combination of a kinetic or turbine drive and a mechanical gear transmission; Figure 2 is a side elevation of the transmission mechanism showing the control mechanism therefor; Figure 3 is a fragmentary perspective view of a mechanism for locking the transmission mechanism in direct drive; Figure 4 is a cross sectional elevation taken on the line 4—4 of Figure 1 and illustrating the constrution of the overriding clutch; Figure 5 is a diagrammatic illustration of the four sets of blades in the kinetic drive mechanism showing the direction of fluid flow when the turbine runner is rotating at low speeds; and Figure 6 is a similar diagram showing the directions of fluid flow at higher runner speeds.

The construction illustrated in Figure 1 comprises an engine housing 9 to which is bolted a housing 10 having mounted therewithin a power transmission device embodying the instant invention. The housing 10 is cast in two parts for convenience of assembly of the transmission mechanism therein, these parts being secured in unitary relationship by means of bolts 11 extending through meeting flanges 12—12. At the engine end of the transmission mechanism the housing is supported by the engine housing 9 to which it is secured as by stud bolts 13, the opposite end of the housing 10 being supported by bearing members 14 comprising a portion of a supporting framework.

Secured to the crank shaft 15 is a flywheel 16 having a hub 17 journaled on the end of the input shaft 18 of the transmission mechanism. Driving connection is had between the flywheel 16 and the input shaft 18 by means of a coupling member 22 splined to the shaft 18 and being movable longitudinally thereof. The coupling member 22 is provided on its end face with teeth 23 adapted to engage with teeth 24 on the end face of the crank shaft 15 for transmitting rotative movement from the crank shaft 15 to the input shaft 18. The coupling member 22 may be actuated by means of a lever arm 25. By this construction there is provided means for disconnecting the transmission mechanism from the crank shaft 15.

The transmission mechanism comprises the input shaft 18 and an output shaft 26 mounted in axial alignment. Rotatably journaled on the driving and driven shafts is a casing 27 receiving therewithin the ends of the respective shafts and having mounted therewithin elements of a kinetic or turbine drive for transmitting torque by means of fluid velocities and pressures, together with elements of a planetary gear transmission for developing torque by means of the ratio differential between gears.

The casing 27 is provided with a forward end plate 28 provided with a shaft opening wherein is mounted the bearings 31 which support the casing on the input end of the shaft. The end plate 28 is provided with an axially extending cylindrical member 32 forming a portion of a clutch mechanism by which the casing 27 is coupled to the input shaft when the speed ratio between the input and output shafts approaches a 1:1 ratio. The cylindrical member 32 is journaled in a bearing 33 mounted in the transverse web 34 forming a part of the casing 10. A ring 35 secured to the web 34 by means of cap screws 36 forms a support for a sealing member 37 having a diaphragm secured between a nut 38 and the inner race of the bearing 33. The nut 38 threadedly engages the outer end of the cylindrical member 32 for retaining the bearing 33 and seal 37 in operative position.

The casing 27 is also provided with a rear end plate 39 provided with an axially extending hub 42 containing bearings 43 within which is journaled the output shaft 26. The hub 42 is journaled in bearings 44 mounted in the rear end of the housing 10 comprising the support for the rear end of the casing 27, a sealing ring 45 being provided between the housing 10 and the hub 42. The hub 42 is provided at its outer end with a retaining ring 46 against which bears one end of a compression spring 47, being part of a mechanism comprising a seal 48 for sealing the shaft opening. The outer end of the output shaft 26 is splined for connection with a universal coupling 49 connected to the driven shaft.

Adjacent the periphery of the end plate 28 is mounted a plurality of radially disposed fan blades 51, and spirally arranged cooling fins 52 are formed as an integral part of the casing 27. It will be noted that the web 34 is provided with a number of openings 53 therethrough adjacent the hub of the web, through which air is drawn into the housing 10 by operation of the fans 51 and spirally arranged cooling fins 52. The air is discharged through openings 54 provided in the inturned rear end of the housing, a forced draft of air being circulated through the housing and around the casing 27 during all times that rotative movement is imparted to the casing 27.

The kinetic drive comprises an impeller 55 suitably secured to the input shaft 18 as by means of a key 56. The impeller 55 comprises an outer shell 57 and an inner shell 58 having impeller vanes 59 extending therebetween. Affixed to the casing 27 and rotatable therewith are vanes 61 arranged in the path of the liquid discharged from the impeller 55 which may function solely as guide vanes, or as combined guide vanes and power vanes, according to the shape of the blades. These guide vanes may be so designed as to cause more or less driving force to be exerted toward driving the casing forward as may be desired to meet the working conditions for various uses. The kinetic drive also comprises a torque converter comprising a turbine runner 62 having vanes 63 arranged in the path of liquid discharged from the vanes 61. The turbine runner 62 is secured to a shaft 64 by means of a key 65. On the discharge side of the turbine vanes 63 is arranged a second set of vanes 66 which function both as guide vanes and as turbine runners, these vanes being secured to the shell 67 to which is also secured the vanes 61, so that the vanes 61 on the discharge side of the impeller 55 and the vanes 66 on the discharge side of the turbine vanes 63 are interconnected for coincidental rotation with the casing 27.

A ring valve 68 is operable to control the flow of fluid from the impeller 55. The ring valve is actuated by a lever arm 69 pivoted at 71 on an extension of the inner shell 58 of the impeller 55 and engages in a bifurcated flange 72 provided on the valve stem 73. Each of the valve stems 73 is slidably mounted on a pin 74 secured at one end to the inner shell 58 of the impeller 55 and which guide movements of the ring valve between open and closed positions. The inner ends of the lever arms 69 are provided with bifurcations 75 which extend over pins 76 secured to a block 77 slidably mounted in a slot 78 milled in the shaft 19. The block 77 is connected by a shaft 79 to a collar 81 movable longitudinally of the input shaft. Movement of the collar 81 in a direction toward the casing 27 causes the ring valve 68 to close the openings through the impeller buckets, throttling the circulation of liquid and reducing the torque transmission capacity of the kinetic drive. When the valve 68 is closed the impeller 55 becomes a liquid flywheel which acts as a balance for the engine and prevents fluid drag on the vanes 61, 63 and 66 such as would cause creeping of the output shaft when the engine is idling. Movement of the collar 81 in a direction toward the flywheel 16 causes withdrawal of the ring valve 68 to open position to permit the flow of fluid through the impeller 55.

Adjacent the periphery of the impeller 55 a seal is provided for preventing the liquid discharged by the impeller from bypassing around the guide vanes 61 and turbine runner back to the impeller inlet. This seal comprises a sealing ring 82 having sealing engagement with a boss 83 on the inner face of the front end plate 28, and a sealing ring 84 having sealing engagement with an inturned flange 85 provided on the adjacent end of the shell 67. The sealing rings 82 and 84 are held in predetermined spaced relation by means of bolts 86, so as to have sealing engagement with the boss 83 and flange 85, respectively. The outer shell 57 of impeller 55 is machined to provide a shoulder 87, and the inner shell 58 is machined to provide a shoulder 88, the sealing rings 82 and 84 being so mounted as to have sealing engagement with each respective shoulder, and each sealing ring and shoulder is provided with lapped surfaces to allow for end movement of impeller 55. The bolts 86 extend loosely through openings provided therefor in the respective inner and outer walls of the impeller. The construction provides for endwise movement in either direction of the impeller to the extent of the clearances between sealing rings 82 and 84 and the outer and inner walls of impeller 55 without exerting end thrust on either sealing ring. Since the sealing rings 82 and 84 rotate with the impeller, there is no friction between the sealing rings and the respective shoulders 87 and 88, and, because the sealing rings are hydraulically balanced and freely rotatable with the impeller, very little friction is developed between the sealing rings and the relatively stationary parts of the casing.

One end of the shaft 64 is received in a pilot bearing 92 provided in the inner end of the input shaft 18, the shaft 64 being also journaled in a bearing 93 mounted in a transverse web 94 of the casing 27. The transverse web 94 divides the casing 27 into two chambers 95 and 96. Mounted within the chamber 95 are the impeller, the guide vanes, and the turbine runner hereinbefore described, which comprises the kinetic drive. Mounted in the chamber 96 is a differential gear train comprising a planetary transmission. Mounted on shaft 64 is the sun gear 97 of the differential transmission, comprising sun gear 97, which is in constant mesh with gear 98 splined on counter shaft 99, and with gear 104 splined on counter shaft 105. Also splined on counter shaft 99 is gear 101 and on counter shaft 105 is gear 110 through which power is transmitted to gear 102 splined on the output shaft 26 for driving the output shaft in the direction of rotation of the input shaft 18. Also splined on counter shaft 105 is gear 106 which is constantly in mesh with gear 107 through which power is transmitted to gear 102 for driving the output shaft 26 in a direction opposed to the direction of rotation of the input shaft 18. Counter shaft 99 is journaled in bearings 103, and counter shaft 105 is journaled in bearings 108, mounted in transverse web portions of the casing 27. The gear 102 is slidably mounted on the output shaft 26, being controlled by a shaft 109 extending longitudinally of the output shaft 26 and having connection with the gear 102 by means of a pin 111 which engages the gear 102 through a slot 112. A collar 113 is mounted on the output shaft exteriorly of the casing 27, being part of a control mechanism presently to be described, for controlling movement of the gear 102.

For driving the output shaft 26 in the direction of rotation of the input shaft 18, power is transmitted from the shaft 64 through sun gear 97, planetary gears 98 and 104, countershafts 99 and 105, and gears 101 and 110 which operate to drive gear 102 in the forward direction. When the direction of rotation of the output shaft 26 is to be reversed, collar 113 is moved longitudinally of the shaft 26 to move gear 102 into mesh with gear 107. When this occurs, power is transmitted from the shaft 64 through sun gear 97, planetary gear 104, countershaft 105, and gears 106 and 107 to drive the gear 102 in the reverse direction. Means is provided for preventing the casing from rotating in the forward direction in response to reaction forces at such time as the output shaft is driven in the reverse direction, such means to be hereinafter more fully described.

The casing 27 is provided with suitable fill and drain plugs (not shown) and oil is supplied to the chambers 95 and 96 substantially to fill these chambers, leaving room, however, for expansion of the oil during operation of the transmission mechanism. A plurality of small openings or ports 114 are provided through the transverse web 94 at a point adjacent the outer periphery of the chamber 96, providing first for the discharge of air from the chamber 95 so that this chamber may be filled with oil, and, second, for the flow of oil from the chamber 95 to the chamber 96 for cooling purposes. In the chamber 96 is provided a suction tube 115 secured to the casing 27 for rotation therewith and having intake ports adjacent its outer ends and a central passage communicating with a worm pump 116 mounted in the shaft 64 for withdrawing oil from the chamber 96 and returning it to the chamber 95. The purpose of the pump 116 is to keep the chamber 95 filled with oil during all times that the transmission is operating in a ratio other than 1:1. Adjacent the intake ports in the outer ends of the suction tube 115 are provided ball check valves 117 for closing the intake to the tubular passage whenever the end of the suction tube 115 extends above the surface of the oil in the chamber 96 during periods of nonrotation of the casing 27. When this occurs, the lower ball check valve 117 drops away from its seat to open the passage in the suction tube 115 to permit the flow of oil therethrough, the upper ball check valve resting on its seat to close the end of the tubular passage in the suction tube and so prevent air from being pumped to chamber 95 through the exposed end of the passage. When the casing is rotating the oil is held by centrifugal force in a ring conforming with the contour of the chamber 96 and the air is forced to the center, and at the same time the ball checks are thrown outwardly by centrifugal force, allowing the oil to be drawn through both ends of the tubing to enter chamber 95. The worm pump is driven by the input shaft 18 to which one end of the pump 116 is secured by means of a nut 118. Thus the pump is driven continuously at the speed of rotation of the input shaft 18, irrespective of the speed of rotation of the shaft 64 within which it is mounted. Oil withdrawn from the chamber 96 by the worm pump 116 is delivered to the chamber 95 through a cross bore 119 provided in the inner end of the input shaft 18.

In Figure 2 is illustrated the controls for the transmission mechanism. The controls are illustrated in their relative positions with respect both to the transmission mechanism and the driver's compartment of an automotive vehicle. The drawings illustrate the floor 121 of a driver's compartment, a foot throttle 122 being pivotally attached to the floor at 123. A link 124 connects the foot throttle 122 with a bell crank 125 pivoted on a shaft 126. The bell crank 125 is connected to the carburetor (not shown) by means of a link 127. In Figure 2 the foot throttle 122 is shown as in the closed position, in which position the engine may be either idling or shut off. A foot pedal 128 is affixed on the free end of a lever 129 extending through the floor 121 and which is pivoted at 131 on a portion 132 of the framework of the vehicle. The pedal 128 is urged to its uppermost position by means of a spring 133 attached at one end to a boss 134 on the lever 129 and at the other end to a boss 135 on the transmission housing 10. The lever 129 is provided with a lateral extension 136 having a pin 137 projecting transversely therefrom for engagement with selective ones of notches 138 and 139 provided in a locking device 141 mounted on a link 142 forming a part of the directional control mechanism presently to be described.

The link 142 is connected at one end to a lever arm 143 mounted on a pivot 144 adjacent the rear end of the housing 10 and connected by means of pins 145 to the collar 113 by means of which movement is imparted to the driven gear 102 to cause it to engage either the forward drive gears 101 and 110 or the reverse gear 107. The opposite end of the link 142 is connected to one arm of a bell crank 146, which in turn is connected by means of suitable linkage 147 to a rod 148 mounted on the steering column 149 and provided with a handle 151 mounted adjacent the steering wheel (not shown). Rotation of the rod 148 in turn rotates the bell crank 146 on its pivot 152 to cause the lever arm 143 to rotate about the pivot 144 and move the collar 113 longitudinally of the output shaft 26 for shifting the gear 102 between forward and reverse positions. As shown in Figure 2, the lever arm 143 has been shifted to the position of forward drive with the gear 102 meshing with the gears 101 and 110 keyed to countershafts 99 and 105, respectively. In this position of the lever arm 143 the locking device 141 is positioned to permit the pin 137 to engage in slot 139 for locking the transmission mechanism in forward drive. The drawings, however, show the foot pedal 128 as being depressed to move the pin 137 out of the slot 139, the rod 148 being then rotatable to move the lever arm 143 to the position of reverse drive wherein the pin 137 engages in slot 138 and gear 102 is moved longitudinally of the output shaft 26 to mesh with reverse gear 107.

Whenever the foot pedal 128 is depressed, as shown in Figure 2, to permit movement of the lever arm 143 between forward and reverse positions of the gear transmission, the ring valve 68 is moved to closed position to throttle the circulation of liquid through the impeller 55 to relieve the load on the gear transmission. With no load on the transmission mechanism the parts rotate in unison, there being no relative rotative movement between the casing 27 and the planetary gear transmission, so that output gear 102 may be shifted between forward and reverse positions without clash of gears. Movement of the ring valve 68 is effected by means of a link 153 connected at one end to the foot pedal lever 129 and at the other end to one arm of a bell crank 154 pivoted at 155 and having a bifurcated arm 156 extending over the collar 81 and engaging the collar by means of pins 157. The link 153 is so connected to the foot pedal lever 129 that rotation of the lever 129 about its pivot 131 rotates the bell crank 154 about its pivot 155 and moves the collar 81 longitudinally of the input shaft 18. Movement of the foot pedal 129 to the position shown in Figure 2 acts through the link 153 to rotate the bell crank 154 about pivot 155 to move the collar 81 in a direction toward the casing 27. Such movement of the collar is imparted by means of the shaft 79 to the block 77 which in turn causes the lever arms 69 to swing about their pivots 71 and move the ring valve 68 to closed position. When the foot pedal 128 is released and the foot pedal lever 129 restored to the position shown in dotted lines in Figure 2, the bell crank 154 is rotated in the clockwise direction to move the collar 81 in a direction away from the casing 27, causing like movement of the block 77 which swings the lever arms 69 about their pivots 71 for moving the ring valve 68 to open position. A spring 158 is attached at one end to the bell crank 154 and at the other end to the housing 10, and yieldably holds the bell crank 154 in the open position of the ring valve 68 against the force exerted by the foot pedal lever 129 and connecting link 153.

For coupling the casing 27 to the input shaft 18, as when the speed of the output shaft 26 approaches the speed of the input shaft 18, there is provided a clutch mechanism comprising the axially extending cylindrical member 32 attached to the end plate 28. It will be noted that the cylindrical member 32 surrounds the input shaft 18, and disposed between the cylindrical member 32 and the shaft 18 is a ring 159 splined to the shaft 18 and having movement longitudinally thereof. Diametrically opposite recesses 161 in the ring 159 provide for engagement of the ring with a pair of inwardly extending lugs 162 provided on the inside of the cylindrical member 32.

Also splined to the input shaft 18 and having longitudinal movement relative to the shaft is a collar 163 having connection with the ring 159 by means of interengaging hooks 164 and 165. The hook 164 is secured to the collar 163 by means of screws 166, the hook 165 being secured to the ring 159 in any suitable manner. Disposed around the shaft 18 between the collar 163 and the ring 159 is a compression spring 167 which acts to move the ring 159 out of engagement with the lugs 162 whenever the collar 163 is moved to the clutch disengaging position shown in Figures 1 and 2.

The clutch control comprises a bifurcated lever 168 pivoted at 169 and engaging the collar 163 by means of pins 171. A tension spring 172 connected at one end to the lever 168 and at the other end to the housing 10 tends to move the collar 163 longitudinally of the shaft 18 in a direction away from the casing 27 and so move the ring 159 into engagement with the lugs 162 which couple the casing 27 to the input shaft. The collar 163 is held in the position shown in Figure 1, in which the clutch is disengaged, by means of a link 173 connected at one end to the lever 168 and provided at its free end with a hook 174. The hook 174 is adapted to be engaged by a hook 175 formed on the free end of a link 176 pivoted at 177 on a frame member 178. The hook 175 is urged into engagement with the hook 174 by means of a compression spring 179.

A rod 181 is journaled on the steering column 149 and is provided with a handle 182 adjacent the steering wheel (not shown). The opposite end of the lever is connected by a link 183 to a lever arm 184 pivoted on the shaft 126 on which is also pivoted the bell crank 125 which connects the foot throttle 122 to the carburetor. The lever arm 184 is provided with a laterally extending lug 185 adapted to engage the link 176 whenever the handle 182 is actuated to rotate the lever arm 184 in the clockwise direction. When this occurs the link 176 is moved downwardly against the force of the spring 179, causing disengagement of the hooks 174 and 175 and enabling the spring 172 to rotate the lever 168 in the clockwise direction to move the collar 163 longitudinally of the shaft 18 and move the clutch ring 159 into engagement with the lugs 162 to couple the casing 27 to the input shaft. It will be noted, however, that the lever arm 184 may be moved into position to cause disengagement of the hooks 174 and 175 only at such times as the foot throttle 122 is in the uplifted or closed position so that the engine is running only at idling speed. When the foot throttle 122 is pressed downwardly to open-throttle position, the short arm of the bell crank 125 is moved into engagement with a lug 186 on the lever arm 184 and prevents movement of the lever arm 184 in the clockwise direction to disengage the aforementioned hooks. When the throttle is released the speed of the engine is reduced to synchronize with the sped of the casing 27, whereupon the lugs 162 engage in the recesses 161 of the ring 159 to lock the unit in direct drive. Whenever the collar 163 is moved longitudinally of the input shaft 18 in the direction of the casing 27 and into the clutch disengaging position shown in Figure 1, compression spring 167 causes subsequent disengagement of the clutch ring 159 and lugs 162 whenever the reaction load on the casing 27 is reduced to the point that the friction load between the ring 159 and the lugs 162 is overcome by force of the spring 167.

In Figure 4 is illustrated a cross sectional elevation of the overriding clutch mounted between the hub 42 of the casing 27 and the end of the housing 10. As shown in Figure 4, the construction comprises a raceway 187 keyed to the housing 10 and a raceway 188 keyed to the hub 42 of the casing 27. At spaced intervals around the periphery of the raceway 188 the raceway is cut away to provide reentrant portions 189 to provide for mounting a plurality of roller bearings 191 between the inner raceway 188 and the outer raceway 187. The roller bearings are mounted in a retaining ring 192 by which the bearings are held in spaced apart relation. Other than at the reentrant portions 189, the inner raceway 188 approaches the raceway 187 too closely to permit the passage of the roller bearings 191 therebetween. Forward direction of rotation of the casing 27 is indicated by the arrow 193. To prevent the roller bearings 191 from wedging themselves between the inner raceway 188 and the outer raceway 187 so as to lock the casing 27 against forward rotation, there is provided a pin 194 adapted to be inserted into the space between the respective raceways and behind each of the roller bearings to prevent the bearings from rolling rearwardly into locking position when the casing is rotated in the forward direction. Each of the pins 194 is of rectangular cross sectional shape, the inner end of the pin being cut at an angle conforming to the shape of the end of the roller bearing with which it is associated.

The pins 194 are affixed to a ring 195 provided with a plurality of guide pins engaging in recesses 196 provided in the inner raceway 188 for holding the ring 195 and pins 194 in proper position relative to the roller bearings 191. The ring 195 and pins 194 are affixed to the hub 42 of the casing 27 and rotate therewith.

The ring 195 to which the pins 194 are attached is loosely engaged by a similar ring 200 to which the ring 195 is secured by a hook member 197. The ring 200 is secured on the inner end of rods 211 having sliding engagement with plungers 198 mounted for reciprocatory movement in wells 199 provided in the end of the housing 10. At their outer ends the plungers 198 are secured to the collar 113 so that movement of the plungers 198 is governed by movement of the collar 113.

When the output shaft 26 is to be driven in the reverse direction, the collar 113 is moved longitudinally of the shaft 26 in a direction away from the casing 27 to cause the gear 102 to mesh with the reverse gear 107. At the same time, plungers 198, being secured to the collar 113, are moved outwardly of wells 199 to move the rings 195 and 200 to the outer end of the chamber 204 for withdrawing the pins 194 from their positions alongside the roller bearings 191. This permits the roller bearings to roll into wedging engagement between the inner raceway 188 and the outer raceway 187 for preventing rotation of the casing 27 in the forward direction in response to reactions tending to rotate the casing in said forward direction.

When the output shaft 26 is to be driven in the forward direction, collar 113 is moved longitudinally of the output shaft in a direction toward the casing 27 to cause the gear 102 to mesh with the forward drive gears 101 and 110. At the same time, plunger 198 is moved inwardly in the well 199 to move the rings 195 and 200 into the position illustrated in Figure 1. In the event, however, that the roller bearings 191 should remain wedged between the respective raceways in the path of movement of the pins 194, movement of the rings 195 and 200 into the position shown is arrested by such roller bearings and the rods 211 caused to move into the cylinder of the plungers 198. Thereupon compression springs 205, each bearing at one end against the inner ends of the plungers 198 and at the other end against the ring 200, urge the pins 194 into position alongside the roller bearings 191 whenever the roller bearings are dislodged from the path of movement of said pins.

In operation, assuming that the crank shaft 15 is directly connected to a prime mover engine, the input shaft 18 is driven thereby through the coupling member 22 in the direction of rotation and at the speed of the crank shaft 15. Let it be assumed, also, that the ring valve 68 is in the closed position illustrated in the drawings, and that the planetary transmission mechanism is in position to transmit rotation to the output shaft in the forward direction. Thereupon the foot pedal 128 is released and returned to its normal position by virtue of the action of the spring 133 and causes the bell crank 154 to be rotated in the clockwise direction to move the collar 81 longitudinally of the shaft 18 in a direction away from the casing 27. This movement of the collar 81, being imparted to the block 77, swings the lever arm 69 about the pivot 71 and moves the ring valve 68 to open position. When this occurs, centrifugal force created by the impeller 55 circulates the liquid through guide vanes 61, turbine runner 62 and guide vanes 66 and back to the suction of the impeller. Guide vanes 61 and 66 are attached to the casing 27 and are permitted rotation in the forward direction, but are held from rotating in the reverse direction by the overriding clutch illustrated in Figure 4. The pitch of the impeller vanes 59 directs the liquid against the vanes 61 at an angle tending to drive the casing 27 in the forward direction, as indicated by arrows 210 in Figure 5. However, the reaction from the load on the output shaft 26 as imparted through the gear transmission to the casing 27 resists the forward rotation of the casing. The vanes 61 function as guide vanes to direct the liquid at the proper angle against the vanes 63 of the turbine runner 62. The vanes 63 of the turbine runner are so shaped that at starting speeds the liquid is directed against the convex surface of the vanes 66 to tend to drive the vanes in the direction opposite to that of the drive shaft. The action and reaction produced upon turbine vanes 63 causes the turbine runner 62 to start rotation in the forward direction, driving sun gear 97 and on through the differential gear transmission to drive the output shaft 26. The reaction from the turbine vanes 63 on the vanes 66, indicated by the arrows 206 in Figure 5, tends to hold the casing stationary against the overriding clutch which prevents the casing from rotating backwards. While the casing is thus held stationary, the liquid is caused to flow from the vanes 66 in the opposite direction to the direction of rotation of the impeller, as indicated by the arrows 207 in Figure 5, and enters the impeller on the front side of the impeller vanes as indicated by the arrows 201 in Figure 5, thereby exerting a force against the torque created by operation of the prime mover engine. This force puts a load on the engine and generates a higher liquid pressure as the liquid leaves the impeller 55, to be redirected against vanes 61, thereby permitting the engine to develop a higher torque at lower speeds.

As the turbine runner 62 gains speed of rotation, the liquid is discharged from the turbine runner in a forward tangential direction relative to the turbine runner and impinges against the concave surface of the vanes 66 as indicated by arrows 205 in Figure 6. At this point in the operation of the mechanism the forces created by the flow of liquid have changed from reacting forces which tend to hold the casing stationary to forces tending to drive the casing in the forward direction. As the sum of the driving forces against vanes 61 and 66 becomes greater than the reaction forces of the gear transmission, the casing begins to rotate in the forward direction. As the casing gains speed of rotation in the forward direction the liquid leaves vanes 66 in a forward tangential whirl around the center of rotation, as indicated by the arrows 207 in Figure 6, and enters the impeller 55 in the direction of rotation of the impeller as shown by arrows 203 in Figure 5. Since the velocity of the liquid leaving vanes 66 is the same as that leaving the impeller 55, the potential forces created by the moving liquid are the same if the liquid is properly directed. The liquid leaving vanes 66 and impinging against the back side of the impeller blades will exert a certain force to help drive the impeller. That force, whatever it may be, will cause the engine to operate with the same open throttle at a higher speed, thereby increasing the velocity of the liquid as it is discharged from the impeller. The higher velocity of the liquid will be converted into either more torque or higher speed of the output shaft. During rotation of the casing vanes 66 become and perform as turbine runners and guide vanes, and vanes 61 act as a fluid coupling and guide vanes. During rotation of the casing 27 vanes 61 also act as an impeller, for the liquid to the extent that the tangential flow of the liquid is increased, which gives a deeper angle entrance to the turbine runner 62 causing it to operate more efficiently at higher speeds.

With the disclosed arrangement of parts, it will be seen that in forward drive there is a relative speed of rotation between the turbine runner 62 and the reaction vanes 61 and 66 attached to the casing 27, which relative speed gradually decreases as the speed of rotation of the housing approaches that of the turbine runner. Under these conditions there is generated a smooth torque curve all the way from zero until the parts approach a 1:1 speed ratio. Different from the usual turbine drives where the stationary vane is used, the vanes 61 and 66 utilize the energy to drive the casing in the forward direction that was formerly exerted against the stationary vanes.

To effect a more efficient operation on long drives, a clutch mechanism is provided to lock shaft 18 to casing 27. This may be accomplished by releasing the foot throttle and moving lever 184 to engage the clutch. To obtain a reverse drive it is necessary only to depress foot pedal 128 and pull down lever 151 at the steering wheel. This operation disengages gear 102 from gears 101 and 110 and engages it with gear 107. At the same time pins 194 are withdrawn from behind each roller in overriding clutch 188 to prevent the casing 27 from rotating in the forward direction. To stop an automobile equipped with the herein described transmission mechanism, it will be necessary only to take the foot off the throttle 122 and depress the brake pedal to avoid creeping. However, to obtain a complete neutral with no creeping, foot pedal 128 must be depressed to close ring valve 68 over the ends of the impeller buckets and so stop circulation of the liquid in the kinetic drive.

The mechanism herein shown and described as embodying the invention is in simple and practical form, it being intended that each part or element thereof may be representative of other parts, elements or mechanisms which may be used in substantially the same manner to accomplish the same or similar results. For example, the countershaft gearing may be varied to suit special requirements. Having illustrated the invention as employing a differential gear train of well known construction, it is intended to be within the scope of the invention to substitute therefor any other known construction which, when coupled with the primary drive in the manner illustrated, will function to produce a compound torque ratio.

Having now described my invention and in what manner the same may be used, what I claim as new and desire to protect by Letters Patent is:

1. A power transmission system comprising first and second transmission mechanisms having input and output shafts, the first of said transmissions driving through said second transmission for producing a compound torque ratio, a forwardly rotatable casing for said transmissions, said first transmission being of the hydraulic turbine torque converter type having guide vanes attached to said casing and said second transmission being of the differential gear type having planet gears journaled in said casing whereby said casing comprises a common reaction member for said transmissions, said casing being responsive to torque developed by said hydraulic transmission for driving against the reaction of said gear transmission, said rotatable casing forming chambers for each said transmission, the chamber in said second transmission forming an oil reservoir, and pump means driven by the input shaft to pump oil from said reservoir to keep said first transmission chamber filled with oil.

2. In a power transmission system comprising conjoined first and second transmission mechanisms, the first transmission driving through the second transmission for producing a compound torque ratio; one of said transmissions being of the hydraulic torque converter type in which liquid is circulated in a closed working circuit comprising impeller means, a first guide stage having fixed vanes located to receive liquid discharged directly from said impeller means, a turbine runner constructed to rotate in the same direction as said impeller means and located to receive liquid discharged from said first guide stage, and a second guide stage having fixed vanes located to receive liquid discharged from said turbine runner, a forwardly rotatable casing constituting a common reaction member for said first and second transmissions, said first and second guide stages being fastened to said casing and rotatable therewith, said casing being restrained against rotation in the direction opposite that of said impeller, and a torque transmitting connection between said turbine runner in said one transmission and the other transmission.

3. In a power transmission system comprising conjoined first and second transmission mechanisms, the first transmission driving through the second transmission for producing a compound torque ratio; a transmission of the hydraulic torque converter type in which liquid is circulated in a closed working circuit comprising impeller means, a first guide stage located to receive liquid discharged directly from said impeller means, a single turbine runner constructed to rotate in the same direction as said impeller means and located to receive liquid discharged from said first guide stage, and a second guide stage located to receive liquid discharged from said turbine runner, a forwardly rotatable casing constituting a common reaction member for said first and second transmissions, said first and second guide stages being fastened to said casing and rotatable therewith, said guide stages when the casing is rotating tending to increase tangentially the flow of liquid entering the turbine runner, and tending to change the flow of liquid from said second guide stage from a reverse direction to a forward tangential direction tending to drive the impeller in the forward direction, said casing being restrained against rotation in the direction opposite that of said impeller, and a torque transmitting connection between said turbine runner and the other transmission.

4. A power transmission system comprising conjoined first and second transmission mechanisms, the first transmission driving through the second transmission for producing a compound torque ratio, one of said transmissions being of the hydraulic torque converter type in which liquid is circulated in a closed working circuit comprising impeller means, a first guide stage located to receive liquid discharged from said impeller means, a turbine runner constructed to rotate in the same direction as said impeller means and located to receive liquid discharged from said first guide stage, and a second guide stage located to receive liquid discharged from said turbine runner, a forwardly rotatable casing common to said first and second transmissions, said first and second guide stages being fastened to said casing and rotatable therewith, said casing being restrained against rotation in the direction opposite that of said impeller, a torque transmitting connection between said casing and said second transmission whereby said casing becomes a driving member when rotated in the forward direction, and a torque transmitting connection between said runner and said second transmission.

5. In a power transmission system comprising conjoined first and second transmission mechanisms, the first transmission driving through the second transmission for producing a compound torque ratio; a transmission of the hydraulic torque converter type having a closed working circuit in which the flow of working liquid is substantially radially outward in a first portion of the circuit and substantially radially inward in a second portion of the circuit, impeller means located in said first portion of said circuit, a first forwardly rotatable guide wheel and a forwardly rotatable turbine wheel located in said circuit between said first and second portions thereof, said guide wheel receiving liquid directly from said impeller means, said second portion of said circuit comprising a smooth-walled open channel of larger area than that of said wheels for returning the flow of liquid to the impeller intake, a second forwardly rotatable guide wheel located in said second portion of said circuit and discharging into said channel, the channel between said turbine wheel and said second guide wheel providing for tangential flow of liquid in said channel in either reverse or forward direction as influenced by speed of rotation of the turbine wheel, a reaction member common to both of said transmissions connected with said guide wheels, and a torque transmitting connection between said runner and the other transmission.

6. In a power transmission system comprising conjoined first and second transmission mechanisms, the first transmission driving through the second transmission for producing a compound torque ratio; a common rotatable reaction member for said transmissions, said first transmission being of the hydraulic torque converter type employing an impeller wheel, a turbine wheel, a first set of guide vanes arranged ahead of said turbine wheel, a second set of guide vanes arranged on the discharge side of said turbine wheel, said guide vanes being fastened to said reaction member, said reaction member being rotatable in the forward direction under the influence of torque developed by the hydraulic transmission, a torque transmitting connection between said runner and said second transmission, and a smooth-walled open channel of larger area than that of said wheels providing for the flow of liquid from said second set of guide vanes to said impeller wheel, said reaction member when rotating in said forward direction causing the flow of liquid from said second set of guide vanes to change from a reverse to a forward tangential direction tending to drive said impeller.

7. A power transmission system comprising first and second transmission mechanisms, the first transmission driving through the second transmission for producing a compound torque ratio, a common rotatable reaction member for said transmissions, said first transmission being of the hydraulic torque converter type employing an impeller wheel, turbine runner and two sets of guide vanes, said guide vanes being attached to the common reaction member, one set of said guide vanes receiving liquid directly from said impeller and the second set of said guide vanes receiving liquid directly from said turbine runner, said reaction member being rotatable only in the forward direction under the influence of torque developed by the hydraulic transmission, and a torque transmitting connection between said runner and said second transmission.

8. A power transmission system comprising conjoined transmission mechanisms each having an input shaft and an output shaft, one of said transmissions being of the hydraulic torque converter type, the other of said transmissions being of the differential gear type, a common shaft constituting the output shaft of one of said transmissions and the input shaft of the other transmission, a rotatable casing common to both said transmissions, the hydraulic transmission comprising an impeller wheel fastened to the input shaft, a turbine wheel fastened to the shaft common to both transmissions, a first set of guide vanes arranged ahead of said turbine wheel and fastened to said casing, a second set of guide vanes arranged on the discharge side of said turbine wheel and fastened to said casing, said casing comprising the carrier for the planet gears of said gear transmission, and means for coupling said casing to the input shaft of the first transmission mechanism for obtaining a 1:1 drive between the driving and driven shafts.

9. A power transmission system comprising an input shaft and an output shaft, a rotatable housing journaled on said shafts, a hydraulic transmission mechanism mounted in said housing and comprising an impeller secured to the input shaft, guide vanes secured to said housing, and a turbine runner, a mechanical gear transmission in said housing comprising a sun gear, planetary gears journaled in said housing, a driven gear secured to the output shaft, means interconnecting said turbine runner and said sun gear whereby said sun gear is driven by said turbine runner, and an overriding clutch having inner and outer raceways, rollers disposed between said raceways and adapted to roll into wedging engagement therewith for restraining rotation of said casing, and means adapted to be moved into position relative to said rollers for preventing said rollers from wedging between said raceways when said casing is rotated in the forward direction.

10. In a power transmission system comprising conjoined first and second transmission mechanisms, the first transmission driving through the second transmission for producing a compound torque ratio; one of said transmissions being of the hydraulic torque converter type having a closed working circuit in which the flow of working liquid is substantially radially outward in a first portion of the circuit and substantially radially inward in a second portion of the circuit, said flow being substantially parallel with the axis of rotation in a portion of the circuit intermediate said radial portions, impeller means located in said first portion of the circuit, a forwardly rotatable guide stage receiving liquid directly from said impeller means, a forwardly rotatable turbine stage located in said intermediate portion of said circuit and a forwardly rotatable guide stage located in said second portion of said circuit and discharging thereinto, a common reaction member for both of said transmissions connected with said guide stages, and a torque transmitting connection between said turbine stage and the other transmission.

11. In a power transmission system comprising conjoined first and second transmission mechanisms, the first transmission driving through the second transmission for producing a compound torque ratio; a forwardly rotatable casing constituting a common reaction member for both transmissions, one of said transmissions being of the hydraulic torque converter type having a closed working circuit in which the flow of working liquid is substantially radially outward in a first portion of the circuit and substantially radially inward in a second portion of the circuit, said flow being substantially parallel with the axis of rotation in a portion of the circuit intermediate said radial portions, impeller means located in said first portion of the circuit, a first guide stage receiving liquid directly from said impeller means, a forwardly rotatable turbine stage located in said intermediate portion of said circuit, a second guide stage located in said second portion of said circuit and discharging thereinto, each of said guide stages being fastened to said casing for rotation relative to said turbine stage, and a torque transmitting connection between said turbine stage and the other transmission.

12. In a power transmission system comprising conjoined first and second transmission mechanisms, the first transmission driving through the second transmission for producing a compound torque ratio; one of said transmissions being of the hydraulic torque converter type having a working circuit consisting of an impeller, two forwardly rotatable guide stages having vanes all of which are fixed in said stages, the first of said guide stages receiving liquid directly from said impeller, and a forwardly rotatable turbine stage located between said two forwardly rotatable guide stages, said guide stages being connected with a common reaction member for both transmissions and restrained against rotation in the direction opposite that of said impeller, and a torque transmission connection between said turbine stage and the other transmission.

13. A power transmission system comprising conjoined transmission mechanisms each having an input shaft and an output shaft, one of said input shafts constituting an input shaft for the system, one of said transmissions being of the hydraulic torque converter type, the other of said transmissions being of the differential gear type, a rotatable casing common to both said transmissions, said casing forming a separate chamber for each said transmission, one of said chambers forming an oil reservoir, and pump means between said chambers driven by said input shaft for the system for supplying oil from said oil reservoir to the other of said chambers.

14. A power transmission system comprising conjoined transmission mechanisms each having an input shaft and an output shaft, one of said transmissions being comprised of an impeller wheel, a guide vane wheel, and a turbine wheel, the other of said transmissions being of the gear reduction type, a common shaft constituting the output shaft of one of said transmissions and the input shaft of the other transmission, a rotatable casing common to both said transmissions, said casing forming a separate chamber for each of said transmissions, means for permitting the flow of fluids from a first one of said chambers to the second one of said chambers, and a worm pump mounted in said common shaft for pumping oil from said second chamber to said first chamber.

15. A power transmission system comprising conjoined transmission mechanisms each having an input shaft and an output shaft, one of said transmissions being comprised of an impeller wheel, a guide vane wheel, and a turbine wheel, the other of said transmissions being of the gear reduction type, a common shaft constituting the output shaft of one of said transmissions and the input shaft of the other transmission, a rotatable casing common to both said transmissions, said casing forming a separate chamber for each of said transmissions, the chamber enclosing the gear transmission comprising an oil reservoir, and means for pumping oil from the chamber comprising said oil reservoir to the other of said chambers through said common shaft.

16. A power transmission system comprising conjoined transmission mechanisms each having an input shaft and an output shaft, one of said transmissions being comprised of an impeller wheel, a guide vane wheel, and a turbine wheel, the other of said transmissions being of the gear reduction type, a common shaft constituting the output shaft of one of said transmissions and the input shaft of the other transmission, a rotatable casing common to both said transmissions, said casing forming a separate chamber for each of said transmissions, the chamber enclosing the gear transmission comprising an oil reservoir, and pump means mounted on said common shaft for supplying oil from the chamber comprising said oil reservoir to the other of said chambers.

17. A power transmission system comprising conjoined transmission mechanisms each having an input shaft and an output shaft, one of said transmissions being comprised of an impeller wheel, a guide vane wheel, and a turbine wheel, the other of said transmissions being of the gear reduction type, a rotatable casing common to both said transmissions, said casing forming a separate chamber for each of said transmissions, passage means for permitting the flow of fluids from a first one of said chambers to the second one of said chambers, and means for returning oil from said second chamber to said first chamber operable independently of the gears in said transmission.

18. A power transmission system comprising conjoined transmission mechanisms each having an input shaft and an output shaft, one of said transmissions being a hydraulic transmission comprised of an impeller wheel, a guide vane wheel, and a turbine wheel, the other of said transmissions being of the gear reduction type, a rotatable casing common to both said transmissions, said casing forming a separate chamber for each of said transmissions, a fluid passage between said chambers for conveying a flow of fluid from the hydraulic transmission chamber to the gear transmission chamber, pump means driven by the input shaft of said hydraulic transmission for returning oil from said gear transmission chamber to said hydraulic transmission chamber, and means for throttling the circulation of oil in said hydraulic transmission chamber for reducing the torque transmitting capacity of said mechanisms.

19. A power transmission system comprising conjoined transmission mechanisms each having an input shaft and an output shaft, one of said transmissions being of the hydraulic torque converter type, the other of said transmissions being of the differential gear type, a common shaft connecting the two transmissions, a rotatable casing common to both said transmissions, said hydraulic transmission comprising an impeller wheel fastened to the input shaft, a turbine wheel fastened to the shaft connecting the two transmissions, a first set of guide vanes arranged ahead of said turbine wheel and fastened to said casing and a second set of guide vanes arranged on the discharge side of said turbine wheel and fastened to said casing, said turbine wheel and said second set of guide vanes being disposed at the maximum distance from the center of rotation permitted by said casing, and a smooth-walled open channel of larger area than that of the wheels providing for the flow of liquid from said second set of guide vanes to said impeller wheel.

20. In a power transmission, an impeller, a reaction member having a first set of vanes receiving directly the output of said impeller, said first set of vanes being disposed diagonally to the axis of said impeller to act as guide vanes when said reaction member is stationary and to act as runner vanes when said reaction member is rotating, a runner receiving the output of said first set of vanes, a second set of vanes on said reaction member receiving the output of said runner, and a gearing component having a reaction member integral with said first mentioned reaction member and a member integral with said runner.

21. A power transmission comprising a fluid driving component and a gearing component, an impeller in said fluid driving component, a reaction member in said fluid component having a first set of vanes receiving the fluid output of said impeller, a runner receiving the output of said first set of vanes, a second set of vanes on said reaction member receiving the output of said runner, means to direct said runner output into said second set of vanes in a direction to oppose the torque of said first set of vanes at low runner speeds and in a direction to assist the torque of said first set of vanes at high runner speeds, a reaction member in said gearing component integral with the reaction member in said fluid driving component and exerting a reaction torque in opposition to the torque exerted by said first set of vanes, and a member in said gearing component integral with said runner.

22. In a power transmission, an impeller, a reaction member having a first set of vanes receiving the output of said impeller, a runner receiving the output of said first set of vanes, a second set of vanes on said reaction member receiving the output of said runner, means for directing the output of said runner into said second set of vanes so that the torque developed by said second set of vanes will be in opposition to the torque developed by the first set of vanes when the runner is rotating at a low speed relative to the velocity of fluid flow and will add to the torque of the first set of vanes when the runner is rotating at a high speed relative to the velocity of fluid flow, a sun gear on said runner, and a planet carrier having a planet gear in mesh with said sun gear, said planet carrier being integral with said reaction member, and said planet gear exerting a reaction torque on said planet carrier in opposition to the torque of said first set of vanes.

23. A power transmission comprising a rotatably mounted housing having a fluid driving chamber and a gearing chamber, a member mounted for rotation in said housing extending into both of said chambers, pump means in said member for pumping hydraulic fluid from said gearing chamber to said fluid driving chamber, a pair of inlets for said pump means on opposite sides of said gearing chamber, and valve means in said inlets responsive to gravity and centrifugal force to open the submerged inlets and close the emerged inlets under all operating and non-operating conditions of said transmission.

24. In a power transmission, two transmissions each capable of producing a multiplication of torque, a first one of said transmissions being of the fluid torque converter type and the second of said transmissions being of the gear type, said two transmissions interconnecting to produce a compound gear ratio, a common reaction member acting as a gear carrier in said second transmission and having first and second sets of vanes mounted thereon in said first transmission, a turbine runner connected to the input shaft of said gear transmission, said second set of vanes acting as reacting vanes for said turbine when the reaction member is stationary, means to change said second set of vanes from reacting vanes to driving vanes to drive said first and second sets of vanes against the reaction of said reaction member to rotate and divide the power output flow between the turbine runner and the reaction member to cause a multiplication of torque during the relative rotation of the turbine runner and reaction member.

25. In a power transmission having two components at least one of which is a fluid driving component, a rotatable reaction member common to both of said components, an impeller in said fluid driving component, a first set of vanes on said reaction member receiving directly the fluid output of said impeller in said fluid driving component, a runner in said fluid driving component receiving the fluid output of said first set of vanes, a second set of vanes on said reaction member receiving the fluid output of said runner, means to direct said runner output into said second set of vanes in a direction to oppose the torque of said first set of vanes at low runner speeds and in a direction to assist the torque of said first set of vanes at high runner speeds, a member in the other component of the transmission connected with said runner, reaction elements in said other component of the transmission carried by said common reaction member for rotation therewith about the axis of said reaction member and disposed in direct torque transmitting relation with said member connected with said runner, and a shaft extending from the transmission having an element disposed in torque transmitting relation with said reaction elements.

DANIEL F. McGILL.

REFERENCES CITED

The following references are of record in the file of this patent:

UNITED STATES PATENTS

| Number | Name | Date |
|---|---|---|
| 1,199,361 | Fottinger | Sept. 26, 1916 |
| 1,855,967 | Jandasek | Apr. 26, 1932 |
| 2,106,423 | DeLavaud | Jan. 25, 1938 |
| 2,146,369 | Dodge | Feb. 7, 1939 |
| 2,158,557 | Van Lammeren | May 16, 1939 |
| 2,190,831 | Dodge | Feb. 20, 1940 |
| 2,205,794 | Jandasek | June 25, 1940 |
| 2,235,370 | Jandasek | Mar. 18, 1941 |
| 2,235,673 | Dodge | Mar. 18, 1941 |
| 2,260,015 | Fichtner | Oct. 21, 1941 |
| 2,465,739 | McGill | Mar. 29, 1949 |

FOREIGN PATENTS

| Number | Country | Date |
|---|---|---|
| 503,319 | Great Britain | Apr. 4, 1939 |
| 441,549 | Germany | Mar. 10, 1927 |